Figure 3:
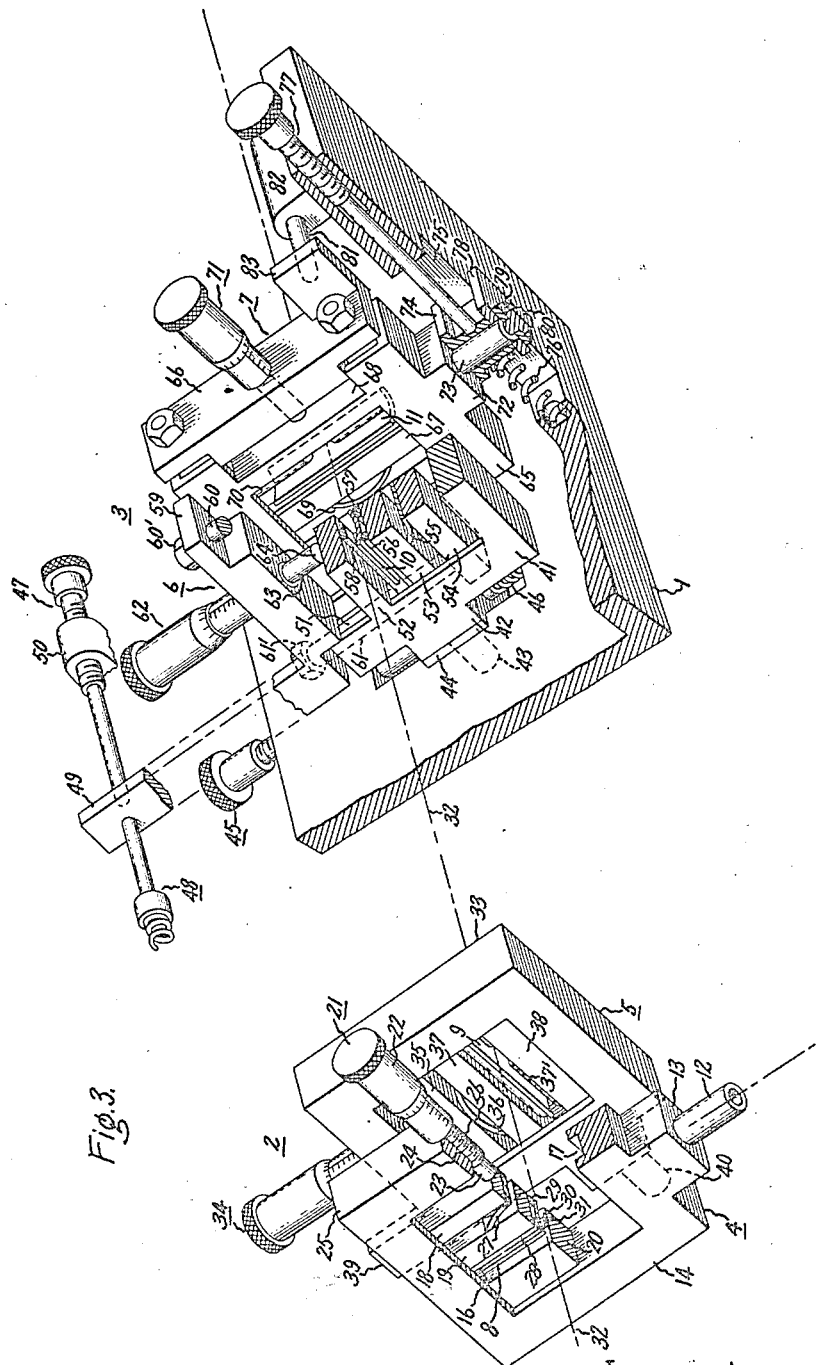

Sept. 22, 1953
D. HARKER
2,653,249
SYSTEM AND APPARATUS FOR THE
FORMATION OF OPTICAL IMAGES
Filed Nov. 30, 1950
2 Sheets—Sheet 1
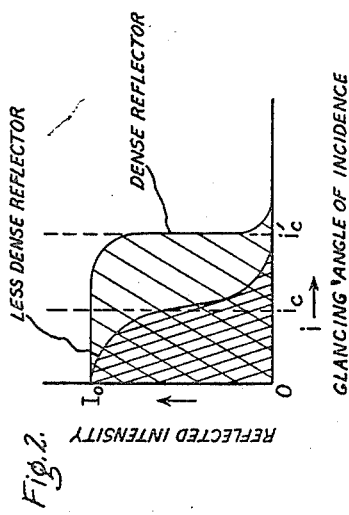
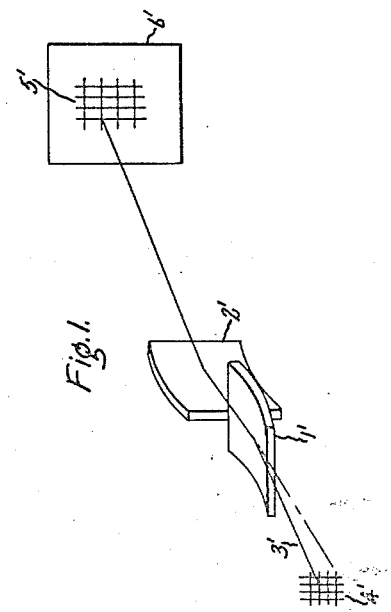
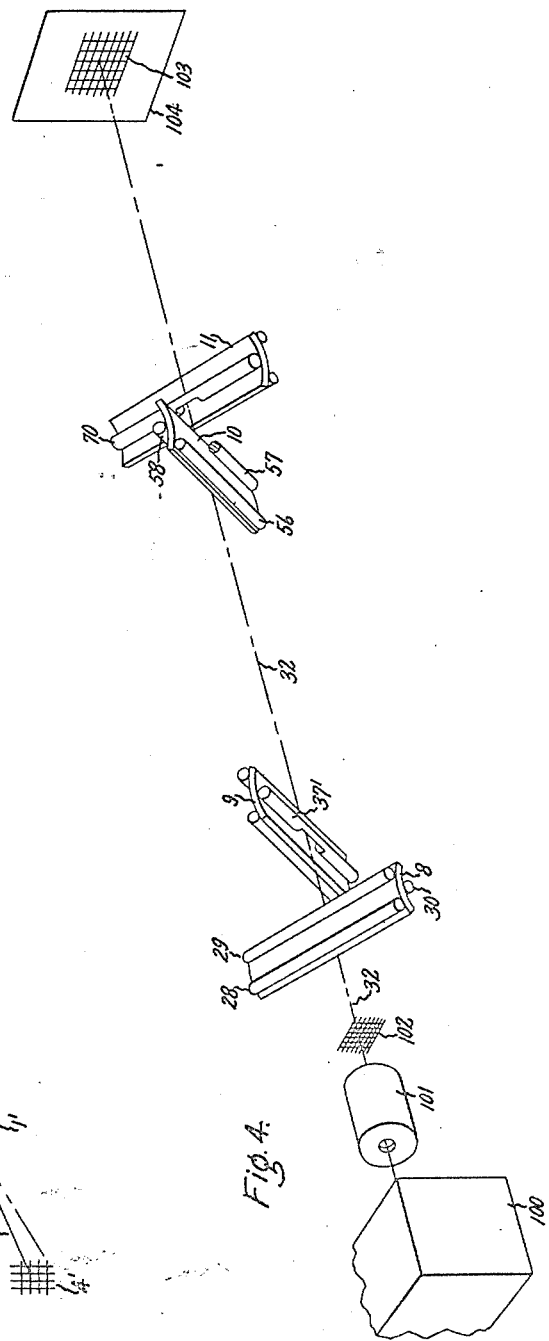
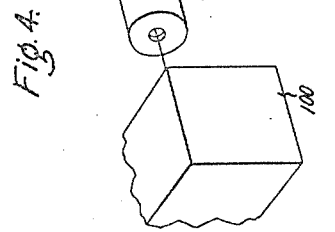
Inventor:
David Harker,
by Paul A. Frank
His Attorney.

Inventor:
David Harker,
by Paul A. Frank
His Attorney.

Patented Sept. 22, 1953

2,653,249

UNITED STATES PATENT OFFICE 2,653,249

SYSTEM AND APPARATUS FOR THE FORMATION OF OPTICAL IMAGES

David Harker, Brooklyn, N. Y., assignor to General Electric Company, a corporation of New York Application November 30, 1950, Serial No. 198,378

19 Claims. (Cl. 250—90)

1

The present invention relates to systems and apparatus for the formation of optical images by reflection of incident radiation and, in particular, relates to the production of undistorted X-ray images by means of total external reflection from concave surfaces.

It has been known since the days of Roentgen and his contemporaries that X-rays cannot be concentrated practically by lenses, because the refractive indexes of commonly employed X-rays with respect to easily obtainable solids are less than unity by such a small amount that the construction of a successful refractive lens system for X-rays would be impractical, if not impossible. Recently, however, in an article published in the "Journal of the Optical Society of America," vol. 38, No. 9 (September 1948), Paul Kirkpatrick and A. E. Baez have suggested the formation of optical images with X-rays by means of total external reflection from concave surfaces. Total external reflection is that which occurs with either crystalline or amorphous surfaces when the glancing angle of the incident X-radiation is sufficiently small, and is to be distinguished from the well-known Bragg diffraction or reflection from the lattice planes of crystalline substances. As suggested in the above-mentioned article, real X-ray images of extended objects may be obtained with two cylindrical lenses or mirrors juxtaposed with their axes essentially perpendicular to each other and to the incident radiation.

Any optical system produces aberrations in the final image, depending upon the curvature of the focusing surfaces, the size of the apertures, and the arrangement of the individual components; nevertheless, these aberrations may be held to some tolerable minimum value by careful design of the equipment involved. In addition to these aberrations, however, the above-mentioned X-ray optical system utilizing two mirrors produces two inherent types of image distortion. One of these types occurs because the two mirrors are non-coincident and, hence, have different magnifications for a common object. The second type is caused by the necessity of employing very small glancing angles for the incident X-radiation whereby the focal surface of the image becomes extremely oblique to the reflected radiation. It is, therefore, a principal object of this invention to provide systems and apparatus for producing undistorted X-ray images.

According to one important feature of the present invention, more fully described and delineated hereinafter, there is provided a system for the formation of optical images by total external reflection of incident radiation which comprises a first set of concave juxtaposed surfaces having axes which are essentially mutually perpendicular and perpendicular to the incident radiation. X-rays reflected from both of these surfaces at a glancing angle less than a defined critical angle produce therebeyond a real image of an extended object. This image is employed as the object for a second set of concave reflecting surfaces which is spaced from the first set. The second set of reflecting surfaces comprises two juxtaposed surfaces having axes which are also essentially mutually perpendicular and perpendicular to the radiation incident thereupon. In order to correct the inherent distortions in the real image produced by the first set of reflecting surfaces and employed as the object for the second set of reflecting surfaces, the directions of concavity and the physical sequence of the two surfaces in the latter set are opposite that of the corresponding reflecting surfaces in the former set.

For the purpose of lending clarity to the description of the present invention, certain usage of terminology will be adopted. For example, the above-mentioned axes of the reflecting surfaces are the longitudinal axes which traverse the length of the respective surfaces. Tangent planes to the surface which contain these axes are essentially parallel to the radiation incident upon the surfaces. Whenever the positions of the various surfaces with respect to each other and to the incident radiation are referred to as "parallel," "essentially parallel," "perpendicular," "essentially perpendicular," or "mutually perpendicular," as the case may be, such terms are to be construed as including the variation from exact parallelism or perpendicularity by small angles approximately equal to the angle of incidence.

The aspects of my invention which are desired to be protected herein are pointed out with particularity in the appended claims. The invention itself, together with further objects and advantages thereof, may best be understood by reference to the following description taken in connection with the accompanying drawings, in which Fig. 1 is a schematic perspective view, useful in explaining the invention; Fig. 2 is a graph, also useful in explaining the invention; Fig. 3 is a perspective illustration of apparatus suitably embodying the invention; and Fig. 4 is a schematic perspective representation useful in explaining the manner in which final undistorted X-ray images are formed according to the invention.

As has been mentioned heretofore, X-rays cannot, as a practical matter, be concentrated by lenses; consequently, an optical image of an object cannot be produced in such fashion with X-rays. However, when X-rays from a point source are reflected at very small glancing angles, usually less than one-half a degree, from a concave spherical or cylindrical reflecting surface or mirror of large radius, they come to focus along a line. If two successive or juxtaposed reflecting surfaces, such as mirrors 1' and 2' shown in Fig. 1, are positioned so that both are nearly parallel to the incident X-ray beam 3' but at right angles to each other, mirror 2' collects to a point the X-rays which mirror 1' allowed to spread out along the line. As the original point source (not shown) is moved, the focused point moves a proportional amount. Consequently, for each point in an extended object, such as wire screen 4', there is produced a corresponding point in the real image 5' appearing upon a suitably positioned detector such as photographic film 6'. In practice, four distinct spots will appear upon photographic film 6', one of which will be the complete image 5'. A second spot will appear in the diagonally lower left position, as a result of the portion of the X-ray beam 3' which passes above mirror 1' to the right of mirror 2', and, thus, continues without reflection to film 6'. Another portion of X-ray beam 3', although it is reflected from mirror 1', will miss mirror 2' and will be recorded to the left of complete image 5'. A fourth spot will appear below complete image 5' and to the right of the above-mentioned second spot, as a result of the part of the beam which passes above mirror 1' but is reflected from mirror 2'.

The magnification of complete image 5' in each plane may be determined by the ratios of the respective image-mirror distances to the object-mirror distances. The focal length $f$ of each of the reflecting surfaces or mirrors 1' and 2' is given by the equation:

$$f = R \sin \frac{i}{2} \cong R \frac{i}{2} \quad (1)$$

where R is the radius of curvature and $i$ is the glancing angle of incidence expressed in radians. From Equation 1 it will be apparent that the image may be focused by adjusting either the glancing angle $i$ or the radius of curvature R of the mirrors 1' and 2', or both. As will appear hereinafter, this fact facilitates an advantageous focusing adjustment according to the invention.

From physical optical considerations, it is possible to obtain total external reflection of X-rays from smooth, solid, reflecting surfaces such as mirrors 1' and 2' because, from air, the X-rays are entering a medium of smaller refractive index. The index of refraction $\pi$ (for X-rays) of common solids is less than unity by an amount which is of the order of $10^{-5}$ or $10^{-6}$. For a given reflecting material and wave length, there is a critical glancing angle $i_c$ above which no reflection occurs. This is illustrated in Fig. 2, wherein the reflected intensity I of X-rays is plotted as a function of the glancing angle of incidence $i$ for a dense reflector and a less dense reflector. The magnitude of the critical angle $i_c$ in radians is directly related to the value of $\delta$ by the law of refraction:

$$\cos i_c = \mu = 1 - \delta \quad (2)$$

Since $i_c$ is small, expanding the cosine function gives $$\cos i_c = 1 - \tfrac{1}{2} i_c^2 \quad (3)$$

and $$i_c = \sqrt{2\delta} \quad (4)$$

to a completely adequate approximation. According to classical dispersion theory, if one ignores absorption of the X-ray beam in the reflecting material, $\delta$ may be calculated from the relation:

$$\delta = n \lambda^2 e^2 \, 2\pi m c^2 \quad (5)$$

where $\lambda$ is the X-ray wavelength in centimeters, $e$ the electronic charge in electrostatic units, $M$ the electronic mass in grams, $c$ the velocity of light in centimeters per second, and $n$ the total number of electrons per cubic centimeter of the reflector. Substituting this value of $\delta$ in Equation 4, the following relation results:

$$i_c = \frac{\lambda e}{c}(n \, \pi m)^{\frac{1}{2}} \quad (6)$$

As a practical matter, the absorption is not large, except for values of $\lambda$ at absorption edges of the constituent elements in the solid material of the reflecting surface and, therefore, Equation 6 results in very accurate calculation of critical angles. It is apparent from Equation 6 that reflecting surfaces having a very high electron density are preferable because higher critical glancing angles of incidence are thus obtained with the consequent advantage of securing better resolution of the image. For metallic materials, such as tungsten or platinum, which have very high electron density, the critical angles are, respectively, 0.0105 and 0.0110 radians, using copper $K_\alpha$ radiation ($\lambda = 1.54 \times 10^{-8}$ cm.). Consequently, it is obvious that, even with the most favorable materials for reflecting surfaces, such as those represented by mirrors 1' and 2' in Fig. 1, the glancing angles of the incident radiation from the respective reflecting surfaces will be of the order of one-half a degree.

Although no attempt has been made to represent image distortion in Fig. 1, it will be realized that the focal surface of the image 5' will not be perpendicular to the X-ray beam 3' but, instead, image 5' will appear along a caustic surface which is extremely oblique to the beam. The reason for this is that a very small increase in the glancing angle of incidence causes a rapid increase in the distance from the reflecting surfaces to the focused image. Consequently, the images formed from extended objects will be considerably distorted. Distortion of this nature is particularly disadvantageous if it is desired to obtain the highest possible resolution of the image. Another form of distortion results because, as will appear from Fig. 1, mirrors 1' and 2' are juxtaposed, thereby making the magnification for each mirror different. Distortion of this nature causes a square object to yield a rectangular image with the greater magnification from the preceding mirror 1'. As will appear hereinafter, the present invention offers systems and apparatus for removing both these forms of distortion.

Referring particularly now to Fig. 3, there is shown a perspective view of means for producing undistorted X-ray images according to the present invention. Mounted in movable fashion, as will be more fully described hereinafter, upon a base member 1 are two sets 2, 3 of mirror or reflecting surface holders comprising holders 4, 5, 6 and 7. Retained within their respective holders are flexible reflecting surfaces or mirrors 8, 9, 10 and 11. Mirror holder 4 is supported from base plate 1 by means of a trunnion 12 extending from a boss 13 upon rectangular frame member 14. Trunnion 12 fits within a bearing and slot (not shown) in base plate 1 such that it is transversely slidable by the operation of a thumb screw (not shown) and rotatable about the axis of trunnion 12, which is coincident with the longitudinal axis of mirror 8, by means of a thumb screw and plunger arrangement (not shown) engaging a flange portion (not shown). For the sake of simplicity in the drawing, the portions not shown in connection with mirror holder 4 will be explained in conjunction with similar portions performing like functions and shown more fully along with mirror holders 6 and 7. In order to provide a means for varying the curvature of flexible mirror 8, rectangular frame member 14 is provided with opposed channels 16 and 17 within which are retained slidable bearing blocks 18 and 19 and fixed bearing block 20. Transverse force may be applied against slidable bearing block 18 by means of a micrometer adjustment member 21 which comprises a rotatable thumb screw portion 22 having a rod 23 rigidly attached thereto and extending through a suitably positioned hole 24 in leg portion 25 of rectangular frame member 14. Barrel portion 26 may be threadably engaged, as shown, within leg portion 25 in order to provide suitable support and position indication for thumb screw portion 22. As thumb screw portion 22 is rotated, transverse force is transmitted through rod 23 to slidable bearing block 18 which bears against a bent leaf spring 27. Spring 27, in turn, bears at its extremities against slidable bearing block 19 which contacts along its opposite surface the peripheries of rods 28 and 29. Opposite slidable block 19, rods 28 and 29, which are spaced from each other and extend generally parallel to the axis of mirror 8, contact mirror 8 such that force thereupon causes mirror 8 to bend about a notched rod 30 as an axis. Rod 30 is retained in fixed position with respect to rectangular frame member 14, since it bears along the portion of its periphery opposite mirror 8 against fixed bearing block 20. The notch 31 in rod 30 is provided to permit the reflection of an X-ray beam, indicated by broken line 32, from the concave surface of mirror 8.

Mirror holder 5 is positioned adjacent mirror holder 4 such that mirrors 8 and 9 are as closely juxtaposed as possible within the limits of mechanical requirements. In this manner, the distortion, mentioned heretofore as resulting from the different magnifications of mirrors 8 and 9, is kept to a minimum. Mirror holder 5 is similar in construction to mirror holder 4 and comprises rectangular frame member 33, micrometer adjustment member 34, movable bearing block 35, leaf spring member 36, movable block 37, notched rod 37', stationary block 38, flange portion 39 and trunnion 40.

Spaced from mirror holder 5 along X-ray beam 32 is mirror holder 6 which comprises a rectangular frame member 41 supported from base plate 1 through a boss 42 and trunnion 43. Trunnion 43 extends into a slidable bearing block 44 which permits transverse movement of rectangular frame member 41 and mirror 10 by means of a thumb screw 45 and a spring 46, the manipulation of which will be more fully understood from the following description of similar adjusting means for mirror holder 7. Limited rotation of mirror holder 6 about the axis of trunnion 43, which is coincident with the longitudinal axis of mirror 10, is afforded through a thumb screw 47 and a spring-loaded plunger 48 which bear, respectively, against the opposite surfaces of a flange 49 of mirror holder 41. Thumb screw 47 may be threadably engaged within a support member 50 rigidly attached to base member 1, and plunger 48 may also be supported from base member 1 by means of a housing (not shown) similar to that which will be described hereinafter in connection with mirror holder 7. Rectangular frame member 41 is provided with an upper channel (not shown) and a lower channel 51 within which fixed bearing block 52 and movable bearing blocks 53 and 54 are positioned. Among the various bearing blocks are inserted a leaf spring 55, mirror 10, rods 56 and 57 and notched rod 58, in a manner similar to that shown in mirror holder 4. The notched slidable yoke portion 59 of mirror holder 41 is attached to slidable block 54 by means of transversely extending studs 60, 61 and nuts 60', 61'. Transverse bending force may be applied to mirror 10 by means of a micrometer adjustment member 62 similar to micrometer adjustment member 21 and having a transversely movable rod 63 bearing at its end 64 against fixed bearing block 52. It will now be apparent that rotation of micrometer member 62 will cause transverse movement of rod 63 with respect to yoke portion 59, whereby, since bearing block 52 is fixed with respect to rectangular frame member 41, the assembly, including slidable yoke member 59 and slidable bearing block 54, will be caused to be moved transversely and thus bend mirror 10 about axially extending notched rod 58.

Mirror holder 7 is positioned with respect to mirror holder 6 as mirror holder 5 is positioned with respect to mirror holder 4 in that they are as closely juxtaposed as possible. As shown in the drawing, mirror holder 7 imparts upward concavity to mirror 11 and comprises a rectangular frame member 65 having a slidable yoke member 66. Supported within rectangular frame member 65 are a movable bearing block 67, a fixed bearing block 68, a spring member 69 and a notched rod 70. Transverse bending force is applied to mirror 11 by means of a micrometer adjustment member 71. Extending from rectangular frame member 65 are a boss 72 and a trunnion 73, the latter of which is retained within a slidable bearing block 74. Bearing block 74 is slidably engaged within a notch 75 within base plate 1 and is maintained in a desired position therewithin by means of a spring 76 and a thumb screw 77. To prevent undesired transverse movement of rectangular frame member 65, trunnion 73 is secured to base plate 1 by means of washer 78, washer 79, and bolt 80. As will now be observed, rotation of thumb screw 77 varies the position of rectangular frame member 65 with respect to base plate 1. Similar transverse adjusting mechanisms are provided for each of the mirror holders 4, 5 and 6, but have not been shown, in order to simplify the drawing, as has been heretofore mentioned. Rotation of mirror holder 65 about the axis of trunnion 73, which is coincident with the longitudinal axis of mirror 11, may be obtained by a spring-loaded plunger 81 supported by a housing 82 and operable in conjunction with a thumb screw arrangement (not shown) bearing against a flange member 83 attached to yoke 66. A suitable thumb screw arrangement for this purpose has been shown and described heretofore in connection with mirror holder 6.

From the foregoing and Fig. 4, wherein portions shown and described hereinbefore are identified by like numerals, the operation of the present invention will be clearly understood. X-rays emanating from a suitable X-ray source 100 and emerging from a collimator 101 as beam 32 to impinge upon an object 102 are totally reflected from concave mirrors 8 and 9 to form a real image (not shown) therebeyond. This complete real image then serves as the object for concave mirrors 10 and 11, whereby a final complete image 103 appears upon a suitable detector such as photographic plate or fluorescent screen 104. The complete real image totally reflected from mirrors 8 and 9 and serving as the object for mirrors 10 and 11 is the only portion of X-ray beam 32 (which has been split into four distinct portions by mirrors 8 and 9 in a manner described hereinbefore in connection with Fig. 1), which is incident upon mirrors 10 and 11.

As discussed above, the complete real image formed by the mirror holder set 2 is greatly distorted and formed along a caustic surface between mirror holder sets 2 and 3. A first form of distortion occurs because mirrors 8 and 9 are non-coincident and, hence, have different magnifications for object 102. A second form is caused by the necessity of reflecting incident X-ray beam 32 at very small glancing angles from mirrors 8 and 9, whereby the focal surface of the image formed thereby becomes extremely oblique to the reflected radiation. According to the present invention, the first form of distortion is compensated for by reversing the physical sequence of mirrors 10 and 11 in mirror holder set 3, i. e., mirror 11, the axis of which lies in a plane parallel to the axis of mirror 8, is positioned beyond mirror 10, the axis of which lies in a plane parallel to the axis of mirror 9. Thus, mirror holder set 2 produces greater magnification in the plane including the axis of mirror 8, while mirror holder set 3 produces greater magnification in the plane including the axis of mirror 10, whereby the distortion due to mirror non-coincidence is eliminated. The second form of distortion is compensated for by reversing the directions of concavity of mirrors 10 and 11 in mirror holder set 3, i. e., mirror 10 is concave in a direction opposite to the direction of concavity of mirror 9, while mirror 11 is concave in a direction opposite the direction of concavity of mirror 8, whereby the distortion due to obliqueness of the image is essentially eliminated. Therefore, though the complete rear image formed along a caustic surface between mirror holder sets 2 and 3 is greatly distorted, the final real image 103 appearing upon detector 104 is free of these distortions.

Although one particular physical arrangement of mirrors 8, 9, 10, and 11 has been illustrated in Figs. 3 and 4, others may be employed in accordance with the invention to secure a distortion-free final image. For example, mirror 8 may have any angular position around X-ray beam 32 and any direction of concavity so long as its axis is essentially perpendicular to beam 32. Mirror 9 may have any direction of concavity but its axis must be essentially perpendicular to the axis of mirror 8 and to X-ray beam 32. Once the positions and directions of concavity of mirrors 8 and 9 have been selected, the positions and directions of concavity of mirrors 10 and 11 are then fixed, i. e., the physical sequence of mirrors 10 and 11 must be reversed from that of mirrors 8 and 9 and the directions of concavity of the corresponding mirrors must also be reversed.

The various heretofore described adjustments shown in Fig. 3 provide advantageous and versatile means for obtaining a focused optical image with X-rays. The micrometer adjustment members 21, 34, 62 and 71 permit desired variation of the curvature of mirrors 8, 9, 10 and 11, respectively, whereby their focal lengths may be altered as desired in accordance with Equation 1. Since the various mirror holders are rotatably supported by means of the respective trunnions 12, 40, 43 and 73, they may be adjusted in order to alter the angle of incidence of mirrors 8, 9, 10 and 11 with respect to the X-ray beam 32. Furthermore, since each of the trunnions is transversely movable with respect to base plate 1, the various flexible mirrors may be properly positioned relative to each other and to X-ray beam 32 or a portion thereof. As will be observed from Fig. 3, the mirror holders are all mounted at an angle of approximately 45 degrees from the vertical and horizontal directions. This mounting at an angle is preferred because it provides a convenient access to the various adjustment members.

The flexible mirrors which may be utilized in accordance with the invention must have several important properties. They must be made of a material which can be worked to a fine permanent optical polish. The reflecting surface should have a high electron density, as is indicated by Equation 5, and be chemically stable. Since the mirrors are bent in mirror holders to obtain desired focusing, their curvature should remain constant under a constant load, and, when the load is diminished, there should be an immediate and appropriate decrease in curvature. Also, since the mirrors are preferably thin (about 0.050 inch), care must be taken to prevent "springing" after polishing. A material suitably meeting these requirements is tungsten carbide. Other suitable materials are tungsten and platinum which may be evaporated in vacuum in a manner well known to those skilled in the art onto a highly polished surface of crystalline quartz or fine tool steel.

With flexible mirrors bent as described in conjunction with Fig. 3, the resulting concave reflecting surfaces have the shapes of parabolic cylinders, providing the cross-section of the flexible mirror is substantially rectangular. This shape is preferable in that spherical aberration is eliminated. It is within contemplation of the present invention, however, that distortion-free final images may be obtained by total external reflection from other shapes of concave reflecting surfaces. For example, circularly cylindrical or elliptically cylindrical or suitable arbitrarily cylindrical concave reflecting surfaces may be formed and utilized in the apparatus of Fig. 3 by constructing the flexible mirrors with appropriately non-uniform cross-sections. Furthermore, distortion-free final images may be obtained by employing optically ground mirrors of proper fixed curvature. In such event, the reflecting surfaces may be spherical, ellipsoidal, or cylindrical, so long as the above described principles for eliminating distortion are observed.

It has been specified heretofore that the axes of the mirrors within each set of mirror holders must be mutually perpendicular as well as perpendicular to the X-radiation incident thereupon. It will be realized, however, that since a discreet glancing angle of incidence is necessary to successful operation of the invention, the mirrors in each set cannot be exactly mutually perpendicular, nor can a mirror in one set lie in a plane exactly parallel to the corresponding mirror in the other set. Nevertheless, because this glancing angle is so small—of the order of one-half a degree—it is intended herewithin to describe the relative positions of the mirrors as "parallel," "essentially parallel," "perpendicular," "essentially perpendicular," or "mutually perpendicular," as the case may be, and the use of these terms is to be construed as including the variation from exact perpendicular or parallel by the glancing angle of incidence.

As will appear to those skilled in the art, the magnification of the final image produced according to the invention may be varied by changing the object to image distances. Greater magnification may be obtained by increasing the separation between mirror holder sets 2 and 3, and if absorption then becomes a limiting factor, the space between sets 2 and 3 or the entire path of the X-ray beam may be enclosed and evacuated or filled with a low density gas such as hydrogen or helium. Also, if X-rays of longer wave-length are employed, this expedient may be desirable.

While specific reference has been made herein to the employment of X-rays for obtaining optical images, it is considered within the scope of the present invention to utilize neutrons and such other rays and particles as may be found to exhibit total external reflection.

While my invention has been described by reference to particular embodiments thereof, alternative constructions will readily occur to those skilled in the art. I, therefore, aim in the appended claims to cover all such equivalent embodiments as may be in the true spirit and scope of the foregoing description.

What I claim as new and desire to secure by Letters Patent of the United States is:

1. A system for the formation of optical images by total external reflection of incident radiation having wavelengths within or shorter than the X-ray spectrum comprising a first concave reflecting surface having its axis perpendicular to the incident radiation, a second concave reflecting surface positioned adjacent said first reflecting surface and having its axis perpendicular to the incident radiation and essentially perpendicular to the axis of said first reflecting surface, a third concave reflecting surface spaced from said second reflecting surface and having its axis lying in a plane essentially parallel to a plane containing the axis of said second reflecting surface, the direction of concavity of said third reflecting surface being opposite the direction of concavity of said second reflecting surface, and a fourth concave reflecting surface positioned adjacent said third reflecting surface and having its axis lying in a plane essentially parallel to a plane containing the axis of said first reflecting surface, the direction of concavity of said fourth reflecting surface being opposite the direction of concavity of said second reflecting surface.

2. A system for the formation of optical images by total external reflection of incident radiation having wavelengths within or shorter than the X-ray spectrum comprising means for producing the incident radiation, a first concave mirror having its axis perpendicular to the incident radiation, a second concave mirror positioned adjacent said first concave mirror and having its axis perpendicular to the incident radiation and essentially perpendicular to the axis of said first mirror, a third concave mirror spaced from said second mirror and having its axis lying in a plane essentially parallel to a plane containing the axis of said second mirror, the direction of concavity of said third mirror being opposite the direction of concavity of said second mirror, and a fourth concave mirror positioned adjacent said third mirror and having its axis lying in a plane essentially parallel to a plane containing the axis of said first mirror, the direction of concavity of said fourth mirror being opposite the direction of concavity of said second mirror.

3. A system for the formation of optical images by total external reflection of incident radiation having wavelengths within or shorter than the X-ray spectrum comprising a first concave flexible mirror having its axis perpendicular to the incident radiation, a second concave flexible mirror positioned adjacent said first concave flexible mirror and having its axis perpendicular to the incident radiation and essentially perpendicular to the axis of said first flexible mirror, a third concave flexible mirror spaced from said second flexible mirror and having its axis lying in a plane essentially parallel to a plane containing the axis of said second flexible mirror, the direction of concavity of said third flexible mirror being opposite the direction of concavity of said second flexible mirror, and a fourth concave flexible mirror positioned adjacent said third flexible mirror and having its axis lying in a plane essentially parallel to a plane containing the axis of said first flexible mirror, the direction of concavity of said fourth flexible mirror being opposite the direction of concavity of said second flexible mirror.

4. A system for the formation of optical images by total external reflection of incident radiation having wavlengths within or shorter than the X-ray spectrum comprising means for producing the incident radiation, a first concave reflecting surface having its axis perpendicular to the incident radiation, a second concave reflecting surface positioned beyond said first concave reflecting surface and having its axis perpendicular to the incident radiation and essentially perpendicular to the axis of said first reflecting surface, a third concave reflecting surface disposed beyond said second reflecting surface and having its axis lying in a plane essentially parallel to a plane containing the axis of said second reflecting surface, the direction of concavity of said third reflecting surface being opposite the direction of concavity of said second reflecting surface, and a fourth concave reflecting surface positioned beyond said third reflecting surface and having its axis lying in a plane essentially parallel to a plane containing the axis of said first reflecting surface, the direction of concavity of said fourth reflecting surface being opposite the direction of concavity of said second reflecting surface.

5. A system for the formation of optical images by total external reflection of incident radiation having wavelengths within or shorter than the X-ray spectrum, comprising a first concave mirror having its axis perpendicular to the incident radiation, a second concave mirror positioned beyond said first concave mirror and having its axis perpendicular to the incident radiation and essentially perpendicular to the axis of said first mirror, a third concave mirror disposed beyond said second mirror and having its axis lying in a plane essentially parallel to a plane containing the axis of said second mirror, the direction of concavity of said third mirror being opposite the direction of concavity of said second mirror, and a fourth concave mirror positioned beyond said third mirror and having its axis lying in a plane essentially parallel to a plane containing the axis of said first mirror, the direction of concavity of said fourth mirror being opposite the direction of concavity of said second mirror.

6. A system for the formation of optical images by total external reflection of incident radiation having wavelengths within or shorter than the X-ray spectrum, comprising a first concave flexible mirror having its axis perpendicular to the incident radiation, a second concave flexible mirror positioned beyond said first concave flexible mirror and having its axis perpendicular to the incident radiation and essentially perpendicular to the axis of said first flexible mirror, a third concave flexible mirror disposed beyond said second flexible mirror and having its axis lying in a plane essentially parallel to a plane containing the axis of said second flexible mirror, the direction of concavity of said third flexible mirror being opposite the direction of concavity of said second flexible mirror, and a fourth concave flexible mirror positioned beyond said third flexible mirror and having its axis lying in a plane essentially parallel to a plane containing the axis of said first flexible mirror, the direction of concavity of said fourth flexible mirror being opposite the direction of concavity of said second flexible mirror.

7. A system for the formation of optical images by total external reflection of incident radiation having wavelengths within or shorter than the X-ray spectrum, comprising a first concave parabolic cylindrical mirror having its axis perpendicular to the incident radiation, a second concave parabolic cylindrical mirror positioned adjacent said first mirror and having its axis perpendicular to the incident radiation and essentially perpendicular to the axis of said first mirror, a third concave parabolic cylindrical mirror spaced from said second mirror and having its axis lying in a plane essentially parallel to a plane containing the axis of said second mirror, the direction of concavity of said third mirror being opposite the direction of concavity of said second mirror, and a fourth concave parabolic cylindrical mirror positioned adjacent said third mirror and having its axis lying in a plane essentially parallel to a plane containing the axis of said first mirror, the direction of concavity of said fourth mirror being opposite the direction of concavity of said second mirror.

8. A system for the formation of optical images by total external reflection of incident radiation having wavelengths within or shorter than the X-ray spectrum, comprising a first concave flexible parabolic cylindrical mirror having its axis perpendicular to the incident radiation, a second concave flexible parabolic cylindrical mirror positioned adjacent said first mirror and having its axis perpendicular to the incident radiation and essentially perpendicular to the axis of said first mirror, a third concave flexible parabolic cylindrical mirror spaced from said second mirror and having its axis lying in a plane essentially parallel to a plane containing the axis of said second mirror, the direction of concavity of said third mirror being opposite the direction of concavity of said second mirror, and a fourth concave flexible parabolic cylindrical mirror positioned adjacent said third mirror and having its axis lying in a plane essentially parallel to a plane containing the axis of said first mirror, the direction of concavity of said fourth mirror being opposite the direction of concavity of said second mirror.

9. A system for the formation of optical images by total external reflection of incident radiation having wavelengths within or shorter than the X-ray spectrum, comprising a first parabolic cylindrical mirror having its axis perpendicular to the incident radiation, a second parabolic cylindrical mirror positioned beyond said first mirror and having its axis perpendicular to the incident radiation and essentially perpendicular to the axis of said first mirror, a third parabolic cylindrical mirror disposed beyond said second mirror and having its axis lying in a plane essentially parallel to a plane containing the axis of said second mirror, the direction of concavity of said third mirror being opposite the direction of concavity of said second mirror, and a fourth parabolic cylindrical mirror positioned beyond said third mirror and having its axis lying in a plane essentially parallel to a plane containing the axis of said first mirror, the direction of concavity of said fourth mirror being opposite the direction of concavity of said second mirror.

10. A system for the formation of optical images by total external reflection of incident radiation having wavelengths within or shorter than the X-ray spectrum, comprising a first flexible parabolic cylindrical mirror having its axis perpendicular to the incident radiation, a second flexible parabolic cylindrical mirror positioned beyond said first mirror and having its axis perpendicular to the incident radiation and essentially perpendicular to the axis of said first mirror, a third flexible parabolic cylindrical mirror disposed beyond said second mirror and having its axis lying in a plane essentially parallel to a plane containing the axis of said second mirror, the direction of concavity of said third mirror being opposite the direction of concavity of said second mirror, and a fourth flexible parabolic cylindrical mirror positioned beyond said third mirror and having its axis lying in a plane essentially parallel to a plane containing the axis of said first mirror, the direction of concavity of said fourth mirror being opposite the direction of concavity of said second mirror.

11. A system for the formation of optical images by total external reflection of an incident beam of radiation having wavelengths within or shorter than the X-ray spectrum, comprising a first pair of juxtaposed concave reflecting surfaces having axes which are essentially perpendicular to each other and to the incident beam of radiation, and a second pair of juxtaposed concave reflecting surfaces disposed beyond said first pair of surfaces with respect to the incident beam of radiation, the axes of said second pair of surfaces being essentially perpendicular to each other and to the incident beam of radiation, the physical sequence and directions of concavity of said second pair of surfaces being opposite that of said first pair of surfaces.

12. A system for the formation of optical images by total external reflection of an incident beam of radiation having wavelengths within or shorter than the X-ray spectrum, comprising means for producing the incident beam of radiation, a first pair of juxtaposed concave mirrors having axes which are essentially perpendicular to each other and to the incident beam of radiation, and a second pair of juxtaposed concave mirrors disposed beyond said first pair of mirrors with respect to the incident beam of radiation, the axes of said second pair of mirrors being essentially perpendicular to each other and to the incident beam of radiation, the physical sequence and directions of concavity of said second pair of mirrors being opposite that of said first pair of mirrors.

13. A system for the formation of optical images by total external reflection of an incident beam of radiation having wavelengths within or shorter than the X-ray spectrum comprising a first pair of juxtaposed concave reflecting surfaces having axes which are essentially perpendicular to each other and to the incident beam of radiation, and a second pair of juxtaposed concave reflecting surfaces disposed beyond said first pair of surfaces with respect to the incident beam of radiation, the axes of said second pair of surfaces being essentially perpendicular to each other and to the incident beam of radiation, the axis of the first reflecting surface of said second pair of reflecting surfaces lying in a plane essentially parallel to a plane including the axis of the second reflecting surface of said first pair of reflecting surfaces, the axis of the second reflecting surface of said second pair of reflecting surfaces lying in a plane essentially parallel to a plane including the axis of the first reflecting surface of said first pair of reflecting surfaces.

14. A system for the formation of optical images by total external reflection of an incident beam of radiation having wavelengths within or shorter than the X-ray spectrum comprising a first pair of juxtaposed concave mirrors having axes which are essentially perpendicular to each other and to the incident beam of radiation, and a second pair of juxtaposed concave mirrors disposed beyond said first pair of mirrors with respect to the incident beam of radiation, the axes of said second pair of mirrors being essentially perpendicular to each other and to the incident beam of radiation, the axis of the first mirror of said second pair of mirrors lying in a plane essentially parallel to a plane including the axis of the second mirror of said first pair of mirrors, the axis of the second mirror of said second pair of mirrors lying in a plane essentially parallel to a plane including the axis of the first mirror of said first pair of mirrors, the direction of concavity of the first mirror of said second pair of mirrors being opposite that of the second mirror in said first pair of mirrors, and the direction of concavity of the second mirror of said second pair of mirrors being opposite that of the first mirror in said first pair of mirrors.

15. In apparatus for the formation of optical images by total external reflection of an incident beam of radiation, the improvement which comprises a mirror holder including a flexible mirror supported along one surface by a fixed axially extending notched rod and along its opposite surface by two spaced apart longitudinally extending rods, said latter two rods being transversely movable to bend said mirror about said fixed axially extending rod to produce a surface for totally reflecting incident radiation.

16. Apparatus for the formation of optical images by total external reflection of an incident beam of radiation comprising a plurality of mirror holders each of which includes a flexible mirror supported along one surface by a fixed axially extending rod and along its opposite surface by two spaced-apart longitudinally extending rods, said latter two rods being transversely movable to bend said mirror about said axially extending rod to produce a surface for totally reflecting incident radiation.

17. Apparatus for the formation of optical images by total external reflection of an incident beam of radiation comprising a plurality of mirror holders each of which includes a flexible mirror supported along one surface by a fixed axially extending notched rod and along its opposite surface by two spaced-apart longitudinally extending rods, said latter two rods being transversely movable to bend said mirror about said axially extending rod to produce a surface for totally reflecting incident radiation.

18. Apparatus for the formation of optical images by total external reflection of an incident beam of radiation comprising a plurality of mirror holders each of which includes a flexible mirror supported along one surface by a fixed axially extending notched rod and along its opposite surface by two spaced-apart longitudinally extending rods, said latter two rods being transversely movable to bend said mirror about said axially extending rod to produce a surface for totally reflecting incident radiation, each of said mirror holders being movable with respect to the incident beam of radiation such that the radiation is incident upon each mirror at an angle within the critical angle of incidence.

19. Apparatus for the formation of optical images by total external reflection of an incident beam of radiation comprising a plurality of mirror holders each of which includes a flexible mirror supported along one surface by a fixed axially extending notched rod and along its opposite surface by two symmetrically spaced-apart longitudinally extending rods, said latter two rods being transversely movable to bend said mirror about said axially extending rod to produce a surface for totally reflecting incident radiation.

DAVID HARKER.

References Cited in the file of this patent

UNITED STATES PATENTS

| Number | Name | Date |
| --- | --- | --- |
| 1,951,404 | Goddard | Mar. 20, 1934 |
| 2,543,630 | Hansen | Feb. 27, 1951 |
| 2,557,662 | Kirkpatrick | June 19, 1951 |
| 2,579,225 | Borst et al. | Dec. 18, 1951 |

OTHER REFERENCES

Formation of Optical Images by X-Rays, by P. Kirkpatrick et al., Journal of the Optical Society of America, vol. 38, No. 9, September 1948, pp. 766–774.

Focusing X-Ray Monochromators, by C. S. Smith, Review of Scientific Instruments, June 1941, pp. 312–314.

Electronics, March 1950, pages 196, 198 and 200.